F. H. SPRUNG.
JURY AXLE.
APPLICATION FILED NOV. 6, 1911. RENEWED AUG. 20, 1913.

1,089,282.

Patented Mar. 3, 1914.
2 SHEETS—SHEET 1.

Witnesses.
Thos. Castberg
F. E. Maynard.

Inventor.
Francis H. Sprung.
by G. H. Strong.
his Atty.

F. H. SPRUNG.
JURY AXLE.
APPLICATION FILED NOV. 6, 1911. RENEWED AUG. 20, 1913.

1,089,282.

Patented Mar. 3, 1914.
2 SHEETS—SHEET 2.

UNITED STATES PATENT OFFICE.

FRANCIS H. SPRUNG, OF SAN JOSE, CALIFORNIA.

JURY-AXLE.

1,089,282. Specification of Letters Patent. Patented Mar. 3, 1914.

Application filed November 6, 1911, Serial No. 658,663. Renewed August 20, 1913. Serial No. 785,820.

*To all whom it may concern:*

Be it known that I, FRANCIS H. SPRUNG, a citizen of the United States, residing at San Jose, in the county of Santa Clara and State of California, have invented new and useful Improvements in Jury-Axles, of which the following is a specification.

This invention relates to supplemental axles for vehicles and particularly for automobiles.

It frequently occurs that the axles and shafts of vehicles, especially of the self-propelled type of automobiles, give way under strains and are totally incapacitated by breakage or are so bent as to be useless.

It is a purpose of the present invention to provide what may be termed a jury axle capable of being readily connected to the vehicle so as to enable it to be propelled to a place of repair.

It is a particular object of the invention to provide a jury axle capable equally for adjustment upon the rear of the vehicle or the front of the vehicle; the design of the elements being such that in one instance the jury axle can be used in lieu of the usual driving axle or can be used in lieu of the vehicle steering axle, connections being provided whereby the axle can be manipulated for steering.

The invention consists of the parts and the construction and combination of parts, as hereinafter more fully described and claimed, having reference to the accompanying drawings, in which—

Figure 1:
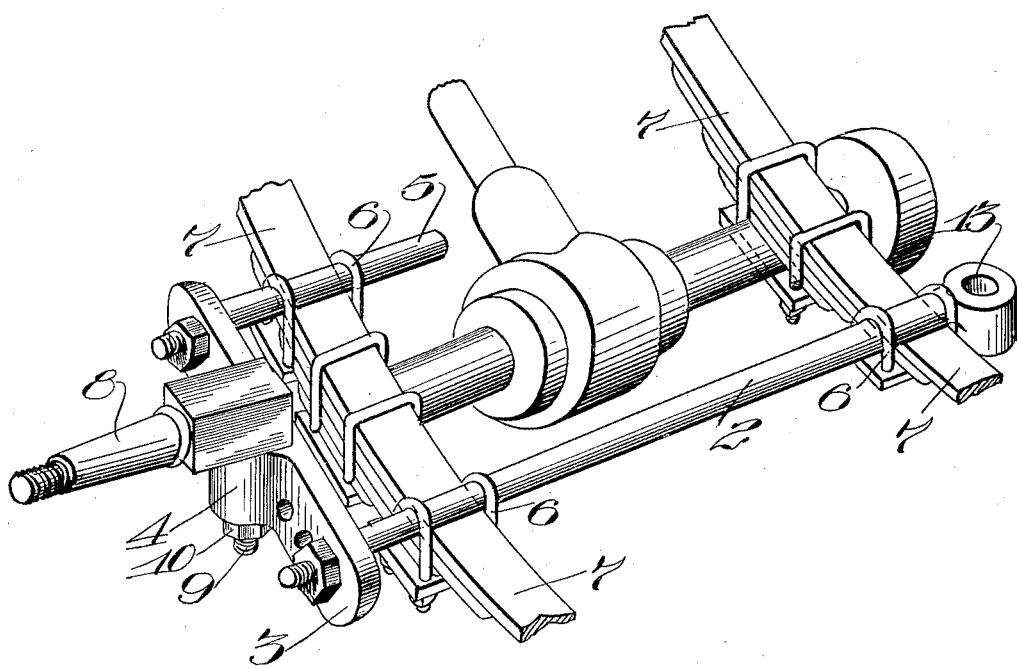
Figure 4:
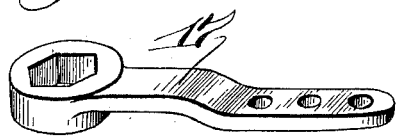
Figure 2:
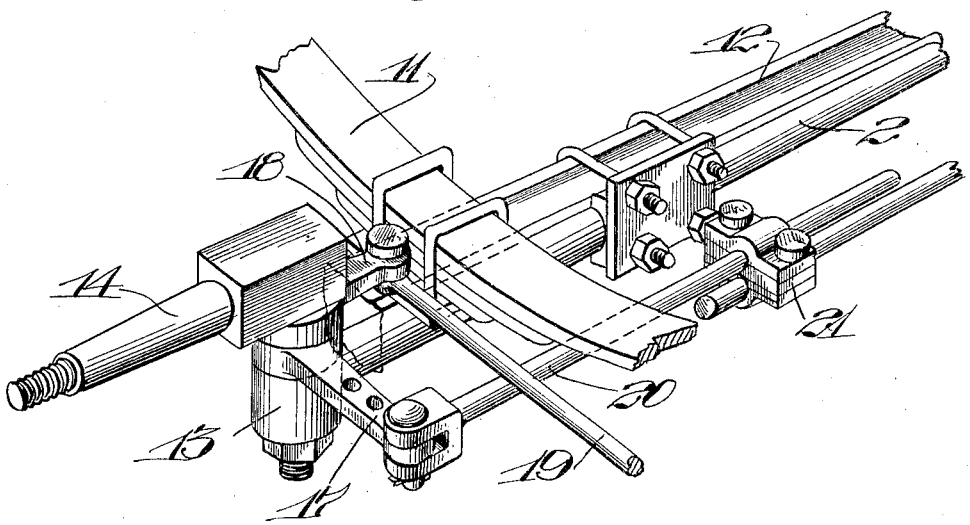
Figure 3:
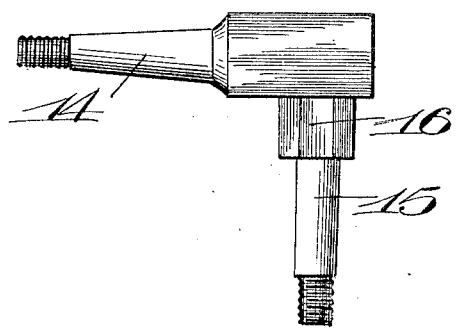

Figure 1 is a perspective view of the jury axle as applied to the rear axle of a vehicle, in which it is designed to receive one of the rear wheels. Fig. 2 is a perspective view of the axle arranged in a position upon the front of the vehicle, and in such relation as to be coupled to the steering mechanism of the vehicle. Fig. 3 is a side elevation of the spindle. Fig. 4 is a perspective view of the steering lever.

It is a desideratum to provide a supplemental apparatus adapted to be adjusted for temporary use as a rear axle or a part of the front axle of a self-propelled vehicle, and to accomplish this diversity of adaptation, I have provided in the apparatus one element or member 2 capable of being assembled with or connected to the vehicle, and which member 2 is utilized in both instances.

The member 2 is here illustrated as forming a transverse rod or bar of considerable length and is shown in Fig. 1 as being adapted to project through, and clamped to, a stirrup or hanger 3, provided with a central boss or bearing 4; the opposite end of the stirrup 3 being shown as connected to a short rod 5 extending inwardly beneath a portion of the vehicle which is not shown, and being connected by clips 6 or other appropriate devices to the vehicle springs 7.

The main rod or lever 2 is of sufficient length to extend from the springs 7 on one side of the vehicle to the opposite parallel springs on the other side, and thus the bar 2 forms a rigid and substantial connection upon which is mounted the stirrup 3. The short rod 5 need only be projected inwardly sufficient to form a substantial means of securing its adjacent end of the stirrup 3 to a convenient spring or other part of the vehicle.

Having assembled and secured the supporting devices 2 and 5 by clips or otherwise to the vehicle springs, there is then securely mounted in the boss or journal 4 of the stirrup 3 a short spindle 8, having a stem 9 which is inserted in and projects through the boss 4 and is secured in place by a nut 10 or other appropriate device. The spindle 8 is by these several connected elements brought into such axial relation with the springs of the vehicle as to afford a temporary support and means of connection for a wheel of the vehicle, which may be mounted upon the spindle 8 and thereby permit the operation of the vehicle to a place where more permanent repairs may be made.

In Fig. 2 I have shown the device or jury axle as connected to the front springs 11 of a vehicle, in this instance the bar 2 being securely clipped or otherwise fastened to a transverse bar or stationary axle 12. There is turnable in the journal or bearing 13 formed on one end of the rod 2 an axle member 14. In order to permit the axle 14 to be connected or coupled to the usual steering apparatus of the vehicle, the axle is provided with a stem portion 15 which projects through and is turnable in bearing 13 of the rod 2. There is formed adjacent the intersection of the axle 14 and the stem 15 a polygonal portion 16, upon which may be slipped steering levers 17—18. One of the levers, as 18, projects at a desired angle from the stem 15 and is adapted to be connected to the steering rod, indicated at 19. Upon the other lever 17 is adapted to be connected an adjustable rod or link 20, which is connected at its opposite end to a steering lever on the other wheel, not shown.

The rod or link 20 is here shown as being formed in two parts, the adjacent ends of which are adapted to overlap and be clamped together by a suitable clamp 21, thereby permitting the connection of the device to vehicles of different width, or to permit the relative angular relation of the steering lever 17 to the steering lever connected to the other end of the link 20.

It will thus be seen that I have provided a jury axle or device adapted to be temporarily connected to a vehicle, and which device is capable of connection in lieu of the rear axle or in lieu of a portion of the front axle, as required. In order to economize the number of parts and thus make the device as inexpensive and simple as possible, I have designed the elements for the purpose of use in either adaptation.

Having thus described my invention, what I claim and desire to secure by Letters Patent is—

1. A supplemental axle for vehicles, comprising a transverse rod adapted to reach across parallel springs, a supplemental supporting rod, a stirrup adapted to be mounted upon the adjacent ends of the rods, and a spindle supported upon said stirrup.

2. A supplemental axle for vehicles, comprising a transverse rod adapted to reach across parallel springs, said rod being adapted for connection at one end to a stirrup, a supplemental supporting rod, a stirrup adapted to be mounted upon the adjacent ends of the rods, and a spindle supported upon said stirrup.

3. A supplemental axle for vehicles, comprising a transverse rod adapted to reach across parallel springs, said rod being adapted for connection at one end to a stirrup, a supplemental supporting rod, a stirrup adapted to be mounted upon the adjacent ends of the rods, a spindle supported upon said stirrup, and means whereby said device may be connected to convenient portions of the vehicle.

4. A supplemental axle for vehicles of the self-propelled type, comprising a transverse rod having a bearing at one end, means for connecting said rod to a portion of a vehicle, and a pivotal adjustable spindle detachably connected to said bearing.

5. A supplemental axle for vehicles, comprising a transverse rod adapted to extend straightway across the springs of the vehicle, said rod having a bearing at one end, means for connecting the rod to a fixed part of the vehicle, a pivoted adjustable spindle detachably connected to said bearing, and means for pivotally adjusting said spindle.

6. A supplemental axle for vehicles, comprising a transverse rod adapted to extend straightway across the springs of the vehicle, said rod having a bearing at one end, means for connecting the rod to a fixed part of the vehicle, a pivoted adjustable spindle detachably connected to said bearing, and means for pivotally adjusting said spindle, said means comprising detachable levers adapted to be mounted upon said spindle.

7. In a device of the class described, a rod provided at one end with a bearing and at the other with fastening means whereby it is adapted in one instance to be secured across parallel springs, and in conjunction with a supplemental rod secured to one of the springs to be secured to a stirrup carried by an axle spindle, to form an emergency rear axle, and in another instance to be secured along a front axle and in conjunction with a steering stub pivotally mounted in said bearing and having levers thereon adapted to be connected to the steering mechanism to form an emergency front or steering axle, substantially as described.

In testimony whereof I have hereunto set my hand in the presence of two subscribing witnesses.

FRANCIS H. SPRUNG.

Witnesses:
J. GRESSLE,
WALLACE AVERY.

---

Copies of this patent may be obtained for five cents each, by addressing the "Commissioner of Patents, Washington, D. C."